US009098784B1

(12) United States Patent
Wu et al.

(10) Patent No.: US 9,098,784 B1
(45) Date of Patent: Aug. 4, 2015

(54) BEAUTIFYING METHOD FOR QUICK RESPONSE CODE AND APPARATUS THEREOF

(71) Applicant: National Taiwan University, Taipei (TW)

(72) Inventors: Ja-Ling Wu, Taipei (TW); Yu-Pei Chang, Taipei (TW); Yu-Hsun Lin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/209,172

(22) Filed: Mar. 13, 2014

(30) Foreign Application Priority Data

Jan. 15, 2014 (TW) .............................. 103101410 A

(51) Int. Cl.
*G06K 19/06* (2006.01)
(52) U.S. Cl.
CPC .... *G06K 19/06103* (2013.01); *G06K 19/06037* (2013.01); *G06K 19/06075* (2013.01)
(58) Field of Classification Search
USPC ................. 235/494, 375, 454, 462.03, 462.1, 235/462.01, 487, 437; 382/100
See application file for complete search history.

(56) References Cited

U.S. PATENT DOCUMENTS

| | | | |
|---|---|---|---|
| 2004/0051783 A1* | 3/2004 | Chellappa et al. | 348/46 |
| 2012/0128199 A1* | 5/2012 | Ono et al. | 382/100 |
| 2012/0229873 A1* | 9/2012 | Itoh | 358/449 |
| 2012/0275641 A1* | 11/2012 | Al-Omari et al. | 382/100 |
| 2013/0026240 A1* | 1/2013 | Hagiwara et al. | 235/494 |
| 2013/0026241 A1* | 1/2013 | Sakahashi et al. | 235/494 |
| 2013/0301870 A1* | 11/2013 | Mow et al. | 382/100 |

OTHER PUBLICATIONS

Yu-Hsun Lin, Yu-Pei Chang, Ja-Ling Wu, Appearance-Based QR Code Beautifier, IEEE Transactions on Multimedia, Nov. 13, 2013, pp. 2198-2207, vol. 15, Issue 8.

* cited by examiner

*Primary Examiner* — Edwyn LaBaze
(74) *Attorney, Agent, or Firm* — Edward Langer, Adv. & Patent Attorney

(57) ABSTRACT

A beautifying method for quick response code (QR code) is provided herein and includes the following steps: a step of setting an image in a QR code; a step of determining an ideal value of a correction code for the QR code; a step of calculating an energy function related to vision beauty condition in accordance with the image, the correction code and the ideal value and a step of optimizing the energy function to obtain a minimum procedure of the energy function of the ideal value.

11 Claims, 9 Drawing Sheets

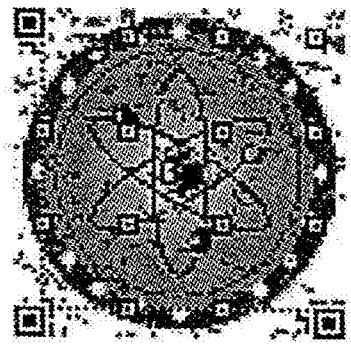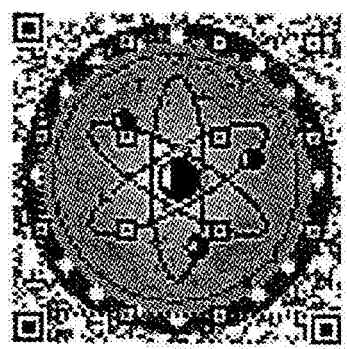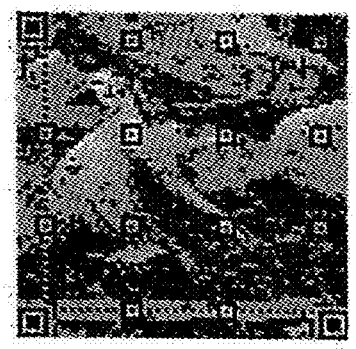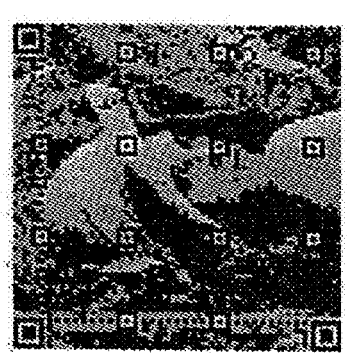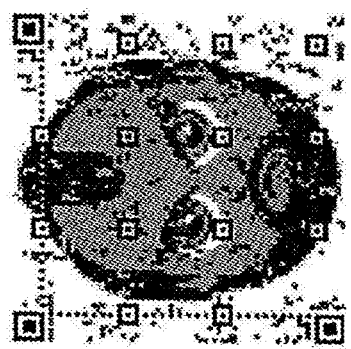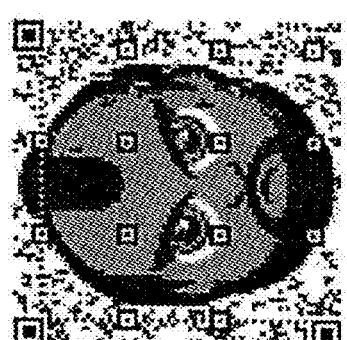
FIG. 8a
FIG. 8b

BEAUTIFYING METHOD FOR QUICK RESPONSE CODE AND APPARATUS THEREOF

CROSS REFERENCE

This application claims priority to Taiwan Application Serial Number 103101410, filed on Jan. 15, 2014, which is herein incorporated by reference.

TECHNICAL FIELD

The present disclosure relates to the field of a beautifying method for quick response code and an apparatus thereof, and more particularly relates to a beautifying method to optimize images in quick response code and an apparatus thereof.

BACKGROUND

Because of the wide-spread use of smart phones and seamless wireless network infrastructures, people are becoming familiar with acquiring information via mobile phones. Quick response (QR) code is proposed as an information container which can be captured and decoded by smart phones directly. QR code is a matrix bar code containing a much larger amount of information than its one dimensional (1D) counterpart. QR code has error correcting capabilities since Reed Solomon (RS) codes have already been integrated into the standard QR codes. With the aid of QR codes, users can avoid tedious typing on the small size screens of smart phones. Numerous applications are therefore built based on QR codes with various sizes, since QR codes provide a convenient way for mobile information acquisition.

FIG. 1a and FIG. 1b are views that illustrate that the conventional QR codes and the images are embedded together in the conventional QR codes. As shown in FIG. 1a and FIG. 1b, the appearance of QR code is designed for machine read only, which consists of meaningless noise-like patterns. The noise-like appearance of QR code will disturb the visual design, when the QR code is put into the host material, say a poster, directly. Since QR code is decoded on the basis of appearance, the design of QR code for producing a visually pleasant appearance while not affecting the accuracy of the decoded message becomes a major challenge. One of the common approaches enforced in QR design is embedding an icon directly. This approach introduces invalid codewords in the resultant QR code, where the changeable area is bounded by the error correction capability, that is, the maximum area is usually less than 30% of the whole QR code area (which is determined by the maximum error correction level of the QR code).

QR code is one of two-dimensional bar codes consisting of black and white square blocks where the smallest block (black or white) is defined as the module of a standard QR code. The codeword of a QR code consists of 8 bits, where one module represents the value of 1 bit (white for logical 0 and black for logical 1). The size of a QR code is determined by the version number V, where V≤40, which corresponds to the size of (17+4V)×(17+4V) modules.

FIG. 2 is a structural view of a conventional QR code. As shown in FIG. 2, the structure of the QR code 20 includes finder patterns 202. The finder patterns 202 are located at the three corners of the QR code 20. The finder pattern 202 is the most important pattern which enables the detection of the position of a QR code. Besides the finder patterns 202, there is timing pattern 204, version information 206, and formation information 208. For a QR code with version number V≥2, there will be alignment patterns 210 for correcting the warping effect. The alignment pattern 210 is for aligning a warping effect. The finder pattern 202, timing pattern 204, and alignment pattern 210 are called function patterns of a QR code. The other regions are defined as encoding regions which can be used to store the information and the error correction codewords.

QR code utilizes RS codes for providing error correcting capabilities where the codewords are represented by and appear in consecutive modules. There are four error correction levels (i.e. L, M, Q, and H from low to high) which can recover 7%, 15%, 25% and 30% of error codewords of the whole QR code. For example, a QR code with version number V=10 and the correction level L is denoted as (10, L)-QR code. Table 1 shows a list of the numbers of data codewords and error correction codewords for different QR code configurations with different error tolerance levels. The target of QR code beautification is to find the valid codewords that achieve a visually pleasing appearance within the search space. Table 1 has demonstrated the difficulty of QR code beautification because of the tremendous number of possible combinations.

| Version, Correction level | Recovery Capacity (%) | Num. of data codewords | Num. of error correction codewords |
| --- | --- | --- | --- |
| (15, L) | 7 | 523 | 132 |
| (15, M) | 15 | 415 | 240 |
| (15, Q) | 25 | 295 | 360 |
| (15, H) | 30 | 223 | 432 |
| (35, L) | 7 | 2306 | 570 |
| (35, M) | 15 | 1812 | 1064 |
| (35, Q) | 25 | 1286 | 1590 |
| (35, H) | 30 | 986 | 1890 |

FIG. 3 illustrates a flowchart for generating a standard QR code, which includes the data analysis, the data encoding, the error correction encoding, and the placement and masking stages. In data analysis Stage S302, the information is analyzed in the data analysis stage S302 which determines the error correction level and the encoding mode (e.g. numeric, alphanumeric). The suitable version and the capacity of QR code are decided is this stage. In data encoding stage S304, the embedding information is encoded into a bit stream according to the associated encoding mode, the terminator symbols (0000) are added to the end of the bit stream and then the resultant bit stream is converted to 8-bit data codewords. If the number of codewords does not reach the capacity of the corresponding QR code, padding codewords are added. In error correction encoding stage S306, in order to resist the noise during QR code acquisition, RS code is integrated into the standard QR code. RS code is utilized to detect and correct noise induced errors. RS code is very useful for correcting burst errors and is one kind of [n, k] non-binary linear block code, where n denotes the length of the coding block and k represents the length of the message (i.e. the number of data codewords). The length of the parity codeword is n−k. RS code can correct up to t errors, where t is calculated as:

$$t = \left[\frac{n-k}{2}\right] - \text{equation (1)},$$

and [x] denotes the largest integer smaller than x.

The values of n and k are fixed in standard QR codes for a given version number and an error correction level. The errors are detected by checking the syndromes, denoted as S(x), which are calculated by multiplying the party-check matrix H with a given RS codeword, C(x), that is S(x)=H(x)·C(x) (equation (2)). The dimension of the parity check matrix H is (n−k)×n, and C(x) is an n×1 column vector. The verification process of legal RS codewords can be represented as:

$$\begin{bmatrix} 1 & 1 & \cdots & 1 \\ \alpha^{n-1} & \alpha^{n-2} & \cdots & 1 \\ \vdots & \vdots & \ddots & \vdots \\ (\alpha^{n-k-1})^{n-1} & (\alpha^{n-k-1})^{n-2} & \cdots & 1 \end{bmatrix} \begin{bmatrix} C_1 \\ C_2 \\ \vdots \\ C_n \end{bmatrix} = \begin{bmatrix} 0 \\ 0 \\ \vdots \\ 0 \end{bmatrix} \quad \text{equation (3)}$$

where $\alpha$ is a primitive root in a finite field F, and both $\alpha$ and F are specified in the QR code as standard.

Within the QR code, there are three kinds of codewords (information, padding and parity) embedded in different regions of a QR code. In the masking stage, the masking operation is utilized to eliminate the situations that the appearance of the encoded codewords in the placement regions are identical to those of the function patterns.

Accordingly, the conventional beautifying method in the QR code is not good enough. A need has arisen to design a beautifying method for the QR code without reducing the identification efficiency of the QR code.

SUMMARY

One objective of the present disclosure is to provide a beautifying method for a QR code, and the beautifying method can enhance the beautifying effect of the embedded image in the QR code without reducing the identification result of the QR code.

According to the objective given above, a beautifying method for the QR code is provided herein and comprises the following steps: a step of embedding an image within the QR code; a step of determining an ideal value of a correction code corresponding to the QR code; a step of calculating an energy function, which is related to a vision beautifying capability, in accordance with the image, the correction code, and the ideal value; and a step of optimizing the energy function to obtain a minimizing process of the energy function of the ideal value.

Another objective of the present disclosure is to provide a beautifying apparatus for the QR code. The beautifying apparatus can reduce the noise of the image in the QR code in order to perform the beautifying effect of the QR code.

According to the aforementioned objective, a beautifying apparatus for the QR code is provided herein and includes a choosing module, a determining module, a distortion detecting module, and an optimizing module. The choosing module is configured for choosing an image and embedding the image with the QR code. The determining module is configured for determining an ideal value of a correction code in the QR code. The distortion detecting module is configured for calculating an energy function of the QR code in accordance with the image, the correction code, and the ideal value. The optimizing module is configured for optimizing the energy function to obtain a minimizing process of the energy function.

DESCRIPTION OF THE DRAWINGS

FIG. 8a and FIG. 8b shows part of the test data; and

DETAILED DESCRIPTION

In the following detailed description of the disclosed embodiments, reference is made to the accompanying drawings which form a part hereof, and are shown by way of illustration of specific embodiments in which the present disclosure may be practiced. In this regard, directional terminology, such as "top," "bottom," "front," "back," "left," "right," "inside," "outside," "side," etc., is used with reference to the orientation of the figure(s) being described. As such, the directional terminology is used for purposes of illustration and is in no way limiting the present disclosure.

Figure 1B:
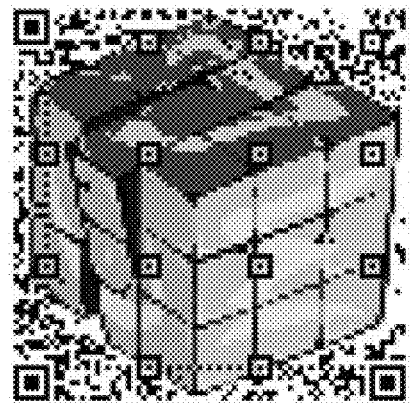
FIG. 1a and FIG. 1b are views illustrating that the conventional QR codes and the images are embedded together in the conventional QR codes.
Figure 1A:
Figure 2:
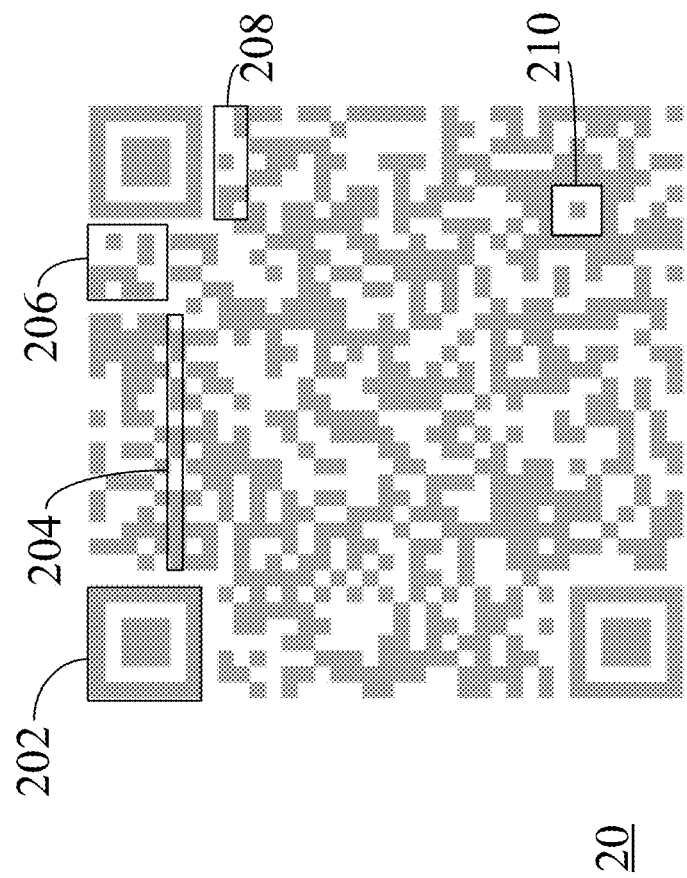
FIG. 2 is a structural view of a conventional QR code.
Figure 3:
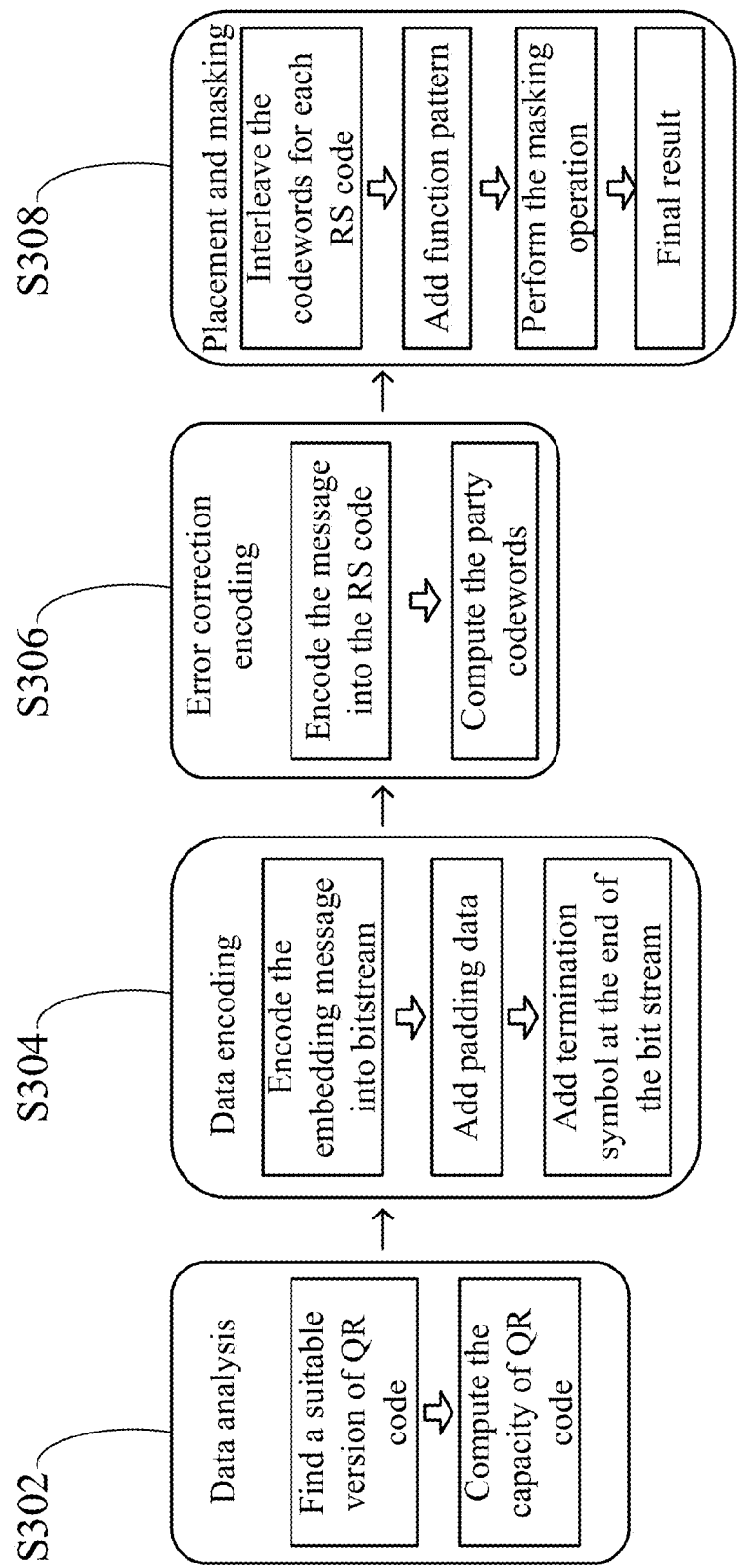
FIG. 3 illustrates a flowchart for generating a standard QR code, which includes the data analysis, the data encoding, the error correction encoding, and the placement and masking stages.
Figure 4:
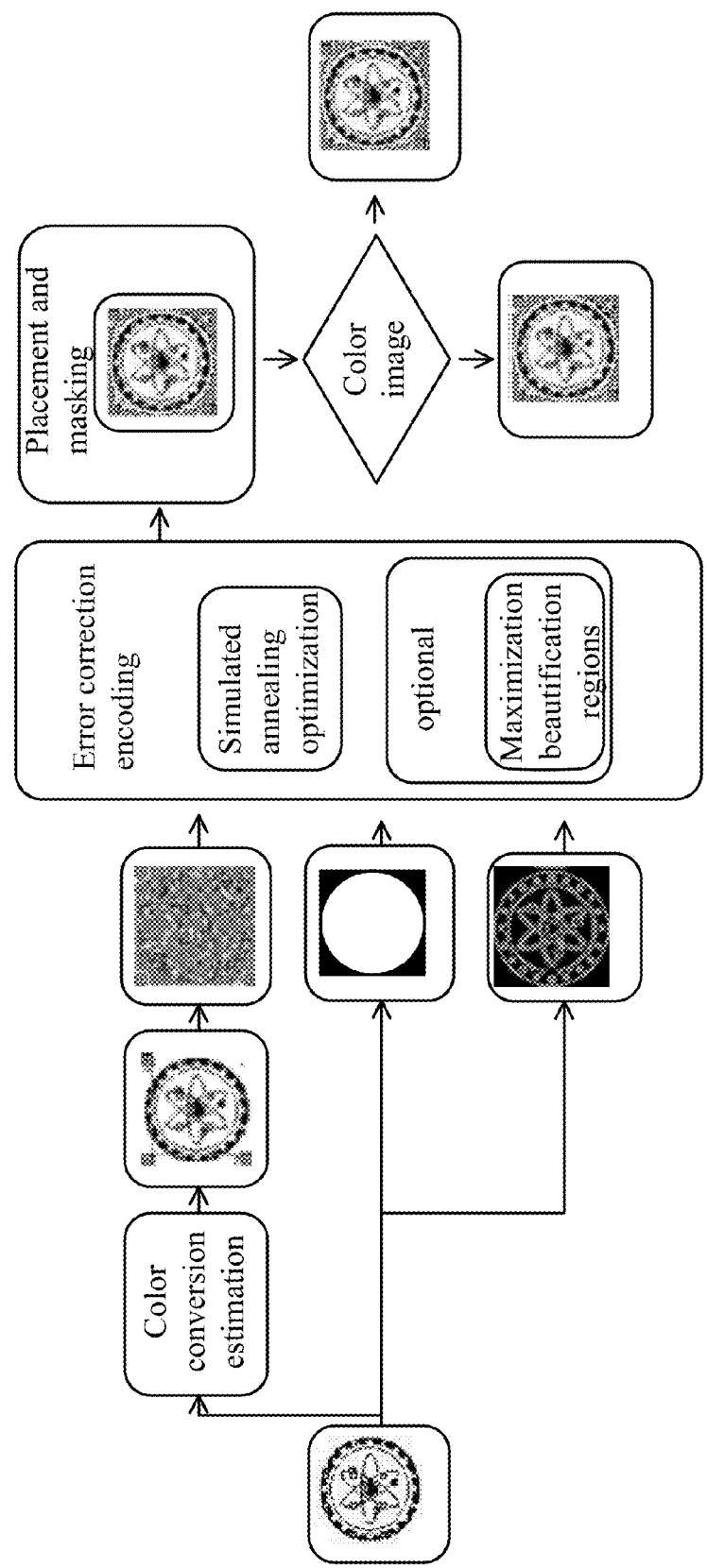
FIG. 4 is a flowchart of the beautifying method for the QR code in one embodiment of the present disclosure.

FIG. 4 is a flowchart of the beautifying method for the QR code in one embodiment of the present disclosure. As shown in FIG. 4, during the information embedding and data encoding, for a given image I which is expected to appear in the beautified QR code $I_Q$, the color of a module mj in $I_Q$ should be equal to the color of a pixel pj in I. The change of color of a module mj is equivalent to changing the value of one bit in an RS codeword (one codeword is represented by 8 bits). The positions of the corresponding 8 modules of i-th RS codeword Ci are denoted as a data block Bi. In addition, if the image I is a color image, it is necessary to convert the color image to be a black and white image at first.

For an [n, k] RS code without embedding message, let an ideal value Ac denote the set of randomly selected k RS codewords with assigned values from the image I, and Uc represent the set of the remaining (n−k) codewords whose values are computed by substituting the assigned values of Ac into equation (3). The values of n and k are determined by the current QR code parameters (i.e. the version number and the error correction level). The target of QR code beautification is therefore equivalent to finding an optimal Ac which minimizes the visual distortion.

Accordingly, an energy function related to vision beautification is calculated. The visual importance (or saliency) of a pixel pj should therefore be taken into consideration for the selection of Ac. The saliency map $S_I$ and edge map $E_I$ of an image I are computed to assist the saliency consideration. The computation of saliency map $S_I$ is conducted as: set $S_I(pj)=1$ (or 0) if the image pixel pj belongs to the foreground (or background). The foreground/background separation is achieved based on the widely used segmentation tools Grab-Cut. The edge map $E_I$ is generated by using an edge detector, such as the widely used canny edge detector, but it is not limited herein. Thereafter, in order to minimize the visual saliency perception distortion in $I_Q$, the corresponding energy (or distortion) function can be defined as: $e(I, I_Q)=\lambda_1 D_h(I_Q,$ I)+$\lambda_2 D_h(S_fQ, S_f)$+$\lambda_3 D_h(E_{IQ}, E_I)$—equation (4), where $D_h$ represents the Hamming distance and $\lambda_{1\sim3}$ are the weighting coefficients. Notice that $I_Q$ is determined by the selection of Ac. As a result, the QR code beautification can therefore be formulated as an optimization problem, that is, $$\min_{Ac} e(I, I_Q)$$

In the error correction stage, in order to deal with these challenges and achieve the goal of generating visually pleasant QR codes, simulated annealing (SA) optimization is chosen as our optimization mechanism, where the visual saliency consideration is also integrated seamlessly. SA optimization is a global optimization mechanism which can achieve the global optimization solution with probability 1 with the expense of a long execution time. However, in a different embodiment, the optimization implemented in the present disclosure can be a local optimization mechanism, and it is not limited herein. In general usage, the global optimization will be terminated early when the results are good enough. SA optimization is chosen because it can be easily integrated with the saliency consideration during optimization.

The following algorithm 1 shows the SA optimization adopted for beautifying the QR code, and the random number r(0, 1) represents a real number randomly selected from the range (0, 1) with uniform distribution.

---

Algorithm: Simulated Annealing Optimization

1: $Ac \leftarrow A_c^0$; $e \leftarrow e(1, 1_Q^0)$
2: $u \leftarrow 0$
3: while $u < u_{max}$ do
4: $T \leftarrow \dfrac{u_{max} - u}{u_{max}}$
5: $A_c^{next} \leftarrow \text{Neighbor}(A_c)$
6: $e_{next} \leftarrow e(I, I_Q^{next})$
7:   if $P(e, e_{next}, T) > r(0, 1)$ then
8:   $A_c^0 \leftarrow A_c^{next}$; $e \leftarrow e_{next}$
9:   end if
10:   $u \leftarrow u + 1$
11: end while

---

Algorithm 2

1. Vc is a queue with sorted codewords in Uc by Ws( ) in descending order
2. for all Cu ∈ Vc do
3.   randomly select a codeword Ca ∈ Ac
4.   If $\dfrac{Ws(Cu)}{ws(Ca) + Ws(Cu)} > r(0, 1)$ then
5.   Ac ∪ {Cu} \ {Ca}
6.   Uc ∪ {Ca} \ {Cu}
7.   end if
8. end for

---

The neighboring state $A_c^{neighbor}$ of Ac is made to contain the visual salient regions with high probability. The selection of $A_c^{neighbor}$ is based on the weight of RS codeword Ci, which can be computed by the Hamming weight of block Bi, that is $Ws(Ci) = 1 + W_h(S_f(Bi))$, where $W_h$ denotes the Hamming weight and $S_f(Bi)$ represents the block Bi in the saliency map $S_f$. The aforementioned equation implies that the weight of RS codeword Ci is proportional to the visual saliency of it, and the constant 1 is added to avoid the denominator becoming zero in step 4 of algorithm 2. The initial $A_c^0$ is generated by choosing randomly from among the codewords with probabilities proportional to the associated image saliency (i.e. $S_f(Bi)$). The codewords in $A_c^{neighbor}$ are generated by swapping the elements between Ac and Uc. The swapping algorithm is described in algorithm 2 and $P(e, e_{next}, T)$ denotes the acceptance probability which is defined as:

$$P(e, e_{next}, T) = \begin{cases} 1, & \text{if } e - e_{next} = \Delta e \geq 0 \\ \exp\left(\dfrac{\Delta e}{T}\right), & \text{if } \Delta e < 0 \end{cases}$$

The acceptance probability follows the definition of standard SA optimization in which the adoption of the next state or not depends on the calculated acceptance probability.

The temperature T plays an important role in the real world annealing process and is used for controlling the acceptance probability in the SA optimization. As long as the cost function is lower than that of the current state, the next state is accepted with probability 1. On the other hand, even though the cost function of next state is higher than that of the current state, the next state may be accepted with probability exp($\Delta e$/T). In this way, the optimization process falling into a local optimum can be avoided.

The original standard QR code is only defined in binary format, where the interpretation of image colors is done depends on the QR decoder used. A QR code decoder will convert the color image into binary image before conducting the message decoding. The noise induced from the conversion of color image is reduced to a binary image by incorporating a better equipped decoder. However, the color conversion process may be different from decoder to decoder. Therefore, the color conversion of the open source QR decoder is used as the decoder in the present disclosure.

Next, the optimized QR code is masked again. If the original image is a color image, the image is colorized again to be the color QR code. If the original image is a black and white image, the QR code can be outputted directly. Since the changeable regions of a QR code are limited to the padding codeword region Rp and the parity codeword regions Re, the changeable regions can be enlarged by implementing the direct embedding method, and the data codeword regions can be directly modified as long as the induced error can be recovered.

Figure 5:
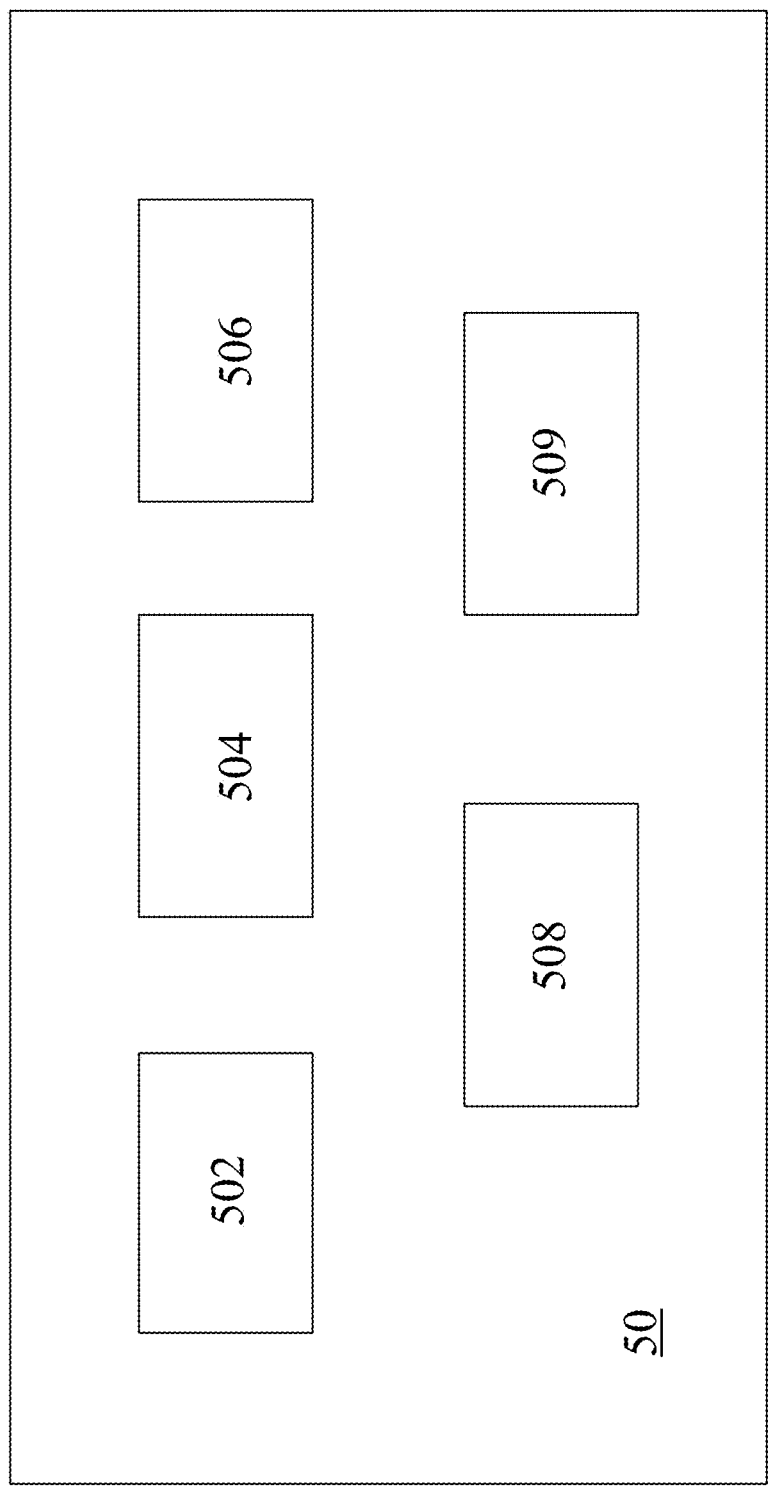
FIG. 5 is a block diagram of a beautifying apparatus for the QR code in one embodiment of the present disclosure.

FIG. 5 is a block diagram of a beautifying apparatus for the QR code in the embodiment of the present disclosure. As shown in FIG. 5, the beautifying apparatus for the QR code includes a choosing module 502, a determining module 504, a distortion detecting module 506, and an optimizing module 508. The choosing module 502 is configured for choosing images and embedding the image with the QR code. The image in the present embodiment can be a black and white image or a color image, and it is not limited herein. If the image is the color image, the color image is required to be converted to a black and white image. The determining module 504 is configured for determining an ideal value of the correction code for the QR code. The ideal value is determined in accordance with the version number and the error correction capability. A different ideal value can be determined in a different QR code or a QR code decoder. The distortion detecting module 506 is configured for calculating an energy function of the correction code in accordance with the correction code and the ideal value. Finally, the optimizing module 508 is configured for optimizing the energy function to obtain the minimum value of the energy function. According to the aforementioned description, the energy function is optimized to obtain the best effect for the beautifying capability of the QR code. In addition, the beautifying apparatus 50 in the present disclosure further includes an image separating tool 509 and the image separating tool 509 can separate the foreground or background picture from the image so as to calculate the energy function of the image.

Figure 6:
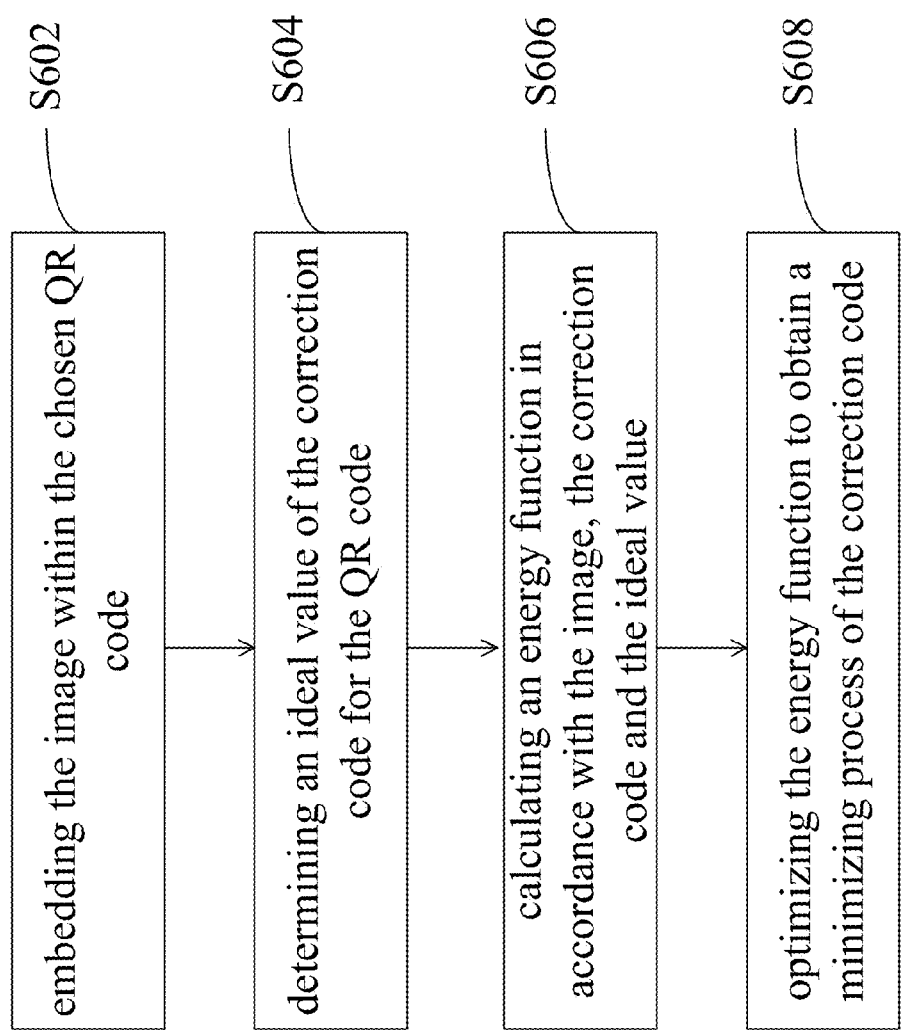
FIG. 6 is a flowchart of the beautifying method for the QR code in one embodiment of the present disclosure.

FIG. 6 is a flowchart of the beautifying method for the QR code in the embodiment of the present disclosure. As shown in FIG. 6, the following description is worked with the components in FIG. 5. First of all, in step S602, the image is embedded within the chosen QR code. The image can be a black and white image or a color image, and it is not limited herein. The image is chosen by a choosing module 502. In step S604, an ideal value of the correction code for the QR code is determined by the determining module 504. The correction code used in the present disclosure is Reed Solomon (RS) code. Thereafter, in step S606, an energy function is calculated in accordance with the image, the correction code and the ideal value by the distortion detection module 506. Finally, in step S608, the energy function is optimized by the optimizing module 508 to obtain a minimizing process of the correction code. In addition, before step S606, the image is separated into the foreground picture and the edge picture.

Figure 7A:
FIG. 7a~FIG. 7c are views illustrated that the vision view of the QR code is improved when the changeable regions are enlarged with different error tolerance levels.
Figure 7B:
Figure 7C:
Figure 9D:
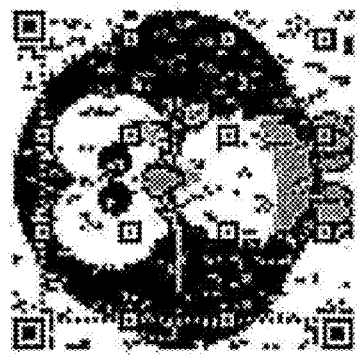
FIG. 9a~FIG. 9d are comparison diagrams that show the difference in the vision quality between the prior art and the present disclosure.
Figure 9C:
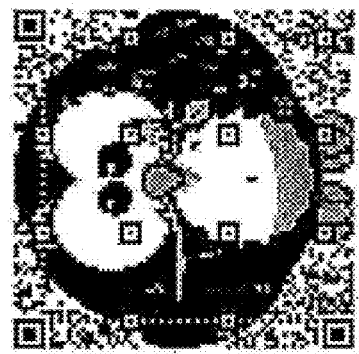
Figure 9B:
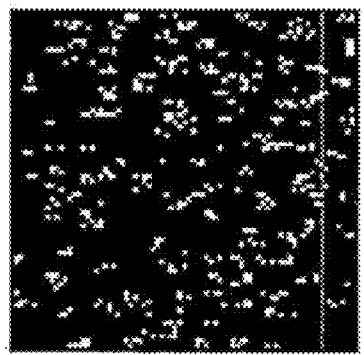
Figure 9A:
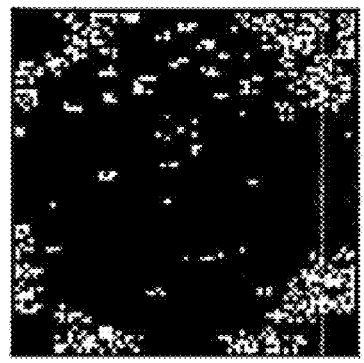

According to the aforementioned description, the changeable regions of the QR code are limited to the padding codeword region, Rp, and the parity codeword regions, Re, and the changeable regions can be enlarged by implementing the direct embedding method, and the data codeword regions can be directly modified as long as the induced error can be recovered. FIG. 7a~FIG. 7c are views illustrating that the vision view of the QR code is improved when the changeable region is enlarged with different error tolerance levels.

| Mobile Phone | App. | Success Rate (Binary) | Success Rate (Color) |
|---|---|---|---|
| iphone 4 | i-nigam | 100% | 100% |
| iphone 4 | QR code engine | 100% | 100% |
| iphone 4 | Easy QR | 100% | 100% |
| HTC Desired HD | QuickMark | 100% | 100% |
| HTC Desired HD | Barcode Scanner | 100% | 96% |
| HTC ARIA | QR Droid | 100% | 87% |
| Sony XPERIA S | QuickMark | 100% | 93% |
| Samsung Galaxy i8150 | QuickMark | 93% | 75% |

FIG. 8a and FIG. 8b show part of the test data, where a (15, L)-QR code is used during the experiments, and direct embedding is not applied. $\lambda_1=0.1$, $\lambda_2=0.9$ and $\lambda_3=0.4$ are set in equation (4) during QR code beautification. Both the subjective and the objective metrics will be applied to evaluate the performance of the proposed QR code beautification framework.

FIG. 9a~FIG. 9d are comparison diagrams showing the vision quality between the prior art and the present disclosure. As shown in FIG. 9a~FIG. 9d, the vision quality of the QR code (image (FIG. 9a) and image (FIG. 9c)) in prior art is worse than the vision quality of the QR code (image (FIG. 9b) and image (FIG. 9d)) in the present disclosure.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), Blu-ray Disc (BD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

As described above, the present disclosure has been described with preferred embodiments thereof and it is understood that many changes and modifications to the described embodiments can be carried out without departing from the scope and the spirit of the present disclosure that is intended to be limited only by the appended claims.

What is claimed is:

1. A beautifying method for a quick response (QR) code, comprising steps of:
choosing an image and embedding the image within the QR code;
determining an ideal value of a correction code corresponding to the QR code, in which the ideal value is determined in accordance with a version number and an error correction level of the QR code;
calculating an energy function, which is related to a vision beautifying capability, in accordance with the image, the correction code and the ideal value; and
optimizing the energy function to obtain a minimizing process of the energy function of the ideal value.

2. The beautifying method according to claim 1, wherein the correction code is a Reed Solomon (RS) code.

3. The beautifying method according to claim 1, wherein the step of optimizing the energy function to obtain the minimizing process of the energy function of the ideal value is a global or local optimization mechanism.

4. The beautifying method according to claim 3, wherein the global optimization mechanism implements a simulated annealing optimization method.

5. The beautifying method according to claim 1, wherein a corresponding black and white image is evaluated in the color image during a decoding process if the image is a color image, before executing the beautifying method, and the color image is adjusted to satisfy a requirement of beautifying and decoding during processing the beautifying method.

6. The beautifying method according to claim 1, further comprising a step of separating a foreground picture and an edge picture from the image.

7. A beautifying apparatus for a QR code, comprising:
a choosing module configured for choosing an image and embedding the image with the QR code;
a determining module configured for determining an ideal value of a correction code in the QR code, in which the ideal value is determined in accordance with a version number and an error correction level of the QR code;
a distortion detecting module configured for calculating an energy function of the QR code in accordance with the image, the correction code and the ideal value; and an optimizing module configured for optimizing the energy function to obtain a minimizing process of the energy function.

8. The beautifying apparatus according to claim 7, wherein the beautifying apparatus converts the image to be a black and white image when the image chosen by the choosing module is a color image.

9. The beautifying apparatus according to claim 7, further comprising an image separating tool for separating the image into a foreground picture and an edge picture.

10. The beautifying apparatus according to claim 7, wherein the correction code is a Reed Solomon code.

11. The beautifying apparatus according to claim 7, wherein the optimizing module is to optimize the energy function by a simulated annealing optimization function to obtain the minimum value of the energy function.

* * * * *